(12) United States Patent
Lee

(10) Patent No.: US 7,569,122 B2
(45) Date of Patent: Aug. 4, 2009

(54) METHOD FOR PURIFYING NITROGEN TRIFLUORIDE

(75) Inventor: Young-Kyun Lee, Youngju-si (KR)

(73) Assignee: Sodiff Advanced Materials Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 12/064,468

(22) PCT Filed: Aug. 31, 2006

(86) PCT No.: PCT/KR2006/003450

§ 371 (c)(1),
(2), (4) Date: Feb. 22, 2008

(87) PCT Pub. No.: WO2007/029940

PCT Pub. Date: Mar. 15, 2007

(65) Prior Publication Data

US 2009/0142248 A1    Jun. 4, 2009

(30) Foreign Application Priority Data

Sep. 7, 2005  (KR) ................. 10-2005-0083015

(51) Int. Cl.
*B01D 3/00*   (2006.01)
*C01B 21/083* (2006.01)

(52) U.S. Cl. ........................... 203/39; 423/406
(58) Field of Classification Search ............ 203/39; 423/406; 210/600; 95/116, 131; 96/108
See application file for complete search history.

(56) References Cited

U.S. PATENT DOCUMENTS

| 4,975,259 A | * | 12/1990 | Hyakutake et al. | .......... 423/406 |
| 5,069,887 A | | 12/1991 | Suenaga et al. | |
| 7,384,618 B2 | * | 6/2008 | Singh et al. | ................. 423/406 |

FOREIGN PATENT DOCUMENTS

| JP | 05-70112 A | 3/1993 |
| KR | 2001-0031951 | 4/2001 |
| KR | 2003-0070836 A | 9/2003 |

\* cited by examiner

*Primary Examiner*—Wayne Langel
*Assistant Examiner*—Brittany M Martinez
(74) *Attorney, Agent, or Firm*—Sughrue Mion, PLLC

(57) ABSTRACT

A highly pure nitrogen trifluoride having a carbon tetrafluoride content of 10 ppm or less can be effectively obtained by boiling crude liquid nitrogen trifluoride having carbon tetrafluoride contaminant under a pressure ranging from 35 to 45 atm, to remove carbon tetrafluoride therefrom through vaporization.

5 Claims, No Drawings

METHOD FOR PURIFYING NITROGEN TRIFLUORIDE

This is a National Stage Application under 35 U.S.C. §371 of PCT/KR2006/003450 filed on Aug. 31, 2006, which claims priority from KR 10-2005-0083015 filed Sep. 7, 2005, all of which are incorporated herein by reference.

TECHNICAL FIELD

The present invention relates to an efficient method for purifying nitrogen trifluoride contaminated by trace carbon tetrafluoride.

BACKGROUND ART

Nitrogen trifluoride ($NF_3$), which is widely used in the step of cleaning a CVD (chemical vapor deposition) device or etching a semiconductor in electronic component industry, is generally prepared by reacting fluorine ($F_2$) with ammonia ($NH_3$) or/and an ammonium salt, or by direct electrolysis of ammonium fluoride. Nitrogen trifluoride thus obtained contains about 10-100 ppm of carbon tetrafluoride ($CF_4$) impurity.

The recent demand of ultra-high purity nitrogen trifluoride requires that the concentration of carbon tetrafluoride be 10 ppm or less.

However, as the boiling points of nitrogen trifluoride and carbon tetrafluoride are very similar, $-129°$ C. and $-128°$ C., respectively, differing by a mere $1°$ C., and the molecular sizes and polarities thereof are also similar, it has been very difficult to remove carbon tetrafluoride from nitrogen trifluoride by a conventional industrial distillation or absorption process.

DISCLOSURE OF INVENTION

Technical Problem

Accordingly, it is an object of the present invention to provide an efficient method for purifying liquid nitrogen trifluoride contaminated by trace carbon tetrafluoride through the removal of carbon tetrafluoride.

Technical Solution

In accordance with one aspect of the present invention, there is provided a method for purifying crude liquid nitrogen trifluoride having carbon tetrafluoride contaminant, which comprises boiling the crude liquid nitrogen trifluoride under a pressure ranging from 35 to 45 atm, to remove carbon tetrafluoride from the liquid nitrogen trifluoride through vaporization.

Advantageous Effects

In accordance with the method of the present invention, ultra-high purity nitrogen trifluoride having a carbon tetrafluoride content of 10 ppm or less can be effectively and economically obtained.

BEST MODE FOR CARRYING OUT THE INVENTION

The purification method of the present invention is characterized by boiling crude liquid nitrogen trifluoride having carbon tetrafluoride impurity under a pressure of 35 to 45 atm, to allow the vaporization of dissolved carbon tetrafluoride therefrom.

When the pressure is lower than 35 atm during the boiling process, the vaporization of carbon tetrafluoride is not satisfactory, and when higher than 45 atm, a relatively large amount of nitrogen trifluoride tends to vaporize together with carbon tetrafluoride. Thus, unless the above-specified pressure range is met, it is very difficult to separate carbon tetrafluoride from crude nitrogen trifluoride.

In the inventive purification, a conventional vessel-type reactor may be used for boiling and degassing. For efficient removal of vaporized gaseous carbon tetrafluoride, an inert gas such as helium, nitrogen and a mixture thereof may be fed to the lower part of the reactor and bubbled through the boiling nitrogen trifluoride liquid to expel the gaseous carbon tetrafluoride therefrom. Alternatively, a packed tower or tray may be installed at the atmospheric region of the reactor for collecting and degassing carbon tetrafluoride vapor.

The boiling of the liquid nitrogen trifluoride in the inventive method is preferably conducted at a temperature in the range of $-38$ to $-50°$ C.

Crude liquid nitrogen trifluoride suitable for use in the inventive purification as a feed contains about 10-100 ppm of carbon tetrafluoride, and it may be prepared by reacting fluorine ($F_2$) with ammonia ($NH_3$) or/and an ammonium salt, or by direct electrolysis of ammonium fluoride.

As described above, the present invention provides a simple and effective method which is capable of preparing ultra-high purity nitrogen trifluoride having a carbon tetrafluoride content of less than 10 ppm.

The following Examples and Comparative Examples are given for the purpose of illustration only, and are not intended to limit the scope of the invention.

EXAMPLE 1

Liquid nitrogen trifluoride containing 47 ppm of carbon tetrafluoride was fed at a rate of 4.3 kg/hr to a 50 L vessel-type reactor (SUS316L) which was pressurized to 38 atm, and was allowed to boil at $-45°$ C. to remove carbon tetrafluoride by vaporization, while keeping the liquid surface at the 50% level of the reactor volume and collecting refined nitrogen trifluoride at a rate of 4.1 kg/hr. The carbon tetrafluoride content of the refined nitrogen trifluoride thus obtained was 5.8 ppm.

EXAMPLE 2

Liquid nitrogen trifluoride containing 12 ppm of carbon tetrafluoride was fed at a rate of 5.7 kg/hr to a 50 L vessel-type reactor which was pressurized to 42 atm, and was allowed to boil at $-39°$ C. to remove carbon tetrafluoride by vaporization, while keeping the liquid surface at the 50% level of the reactor volume and collecting refined nitrogen trifluoride at a rate of 5.3 kg/hr. A 1000 mm-sized packed tower was placed in the atmospheric region of the reactor. The carbon tetrafluoride content of the refined nitrogen trifluoride thus obtained was 0.8 ppm.

COMPARATIVE EXAMPLE 1

Liquid nitrogen trifluoride containing 43 ppm of carbon tetrafluoride was fed at a rate of 4.8 kg/hr to a 50 L vessel-type reactor which was pressurized to 33 atm, and was allowed to boil at $-50°$ C. to remove carbon tetrafluoride by vaporization, while keeping the liquid surface at the 50% level of the reactor volume and collecting refined nitrogen trifluoride at a rate of 4.1 kg/hr. The carbon tetrafluoride content of the refined nitrogen trifluoride thus obtained was 46 ppm.

COMPARATIVE EXAMPLE 2

Liquid nitrogen trifluoride containing 39 ppm of carbon tetrafluoride was fed at a rate of 4.8 kg/hr to a 50 L vessel-type reactor which was pressurized to 48 atm, and was allowed to boil at −35° C. to remove carbon tetrafluoride by vaporization, while collecting refined nitrogen trifluoride at a rate of 4.2 kg/hr. Wherein, it was impossible to keep the liquid surface at a certain level of the reactor volume. The carbon tetrafluoride content of the refined nitrogen trifluoride thus obtained was 40 ppm.

While the invention has been described with respect to the above specific embodiments, it should be recognized that various modifications and changes may be made to the invention by those skilled in the art which also fall within the scope of the invention as defined by the appended claims.

The invention claimed is:

1. A method for purifying crude liquid nitrogen trifluoride having carbon tetrafluoride contaminant, which comprises boiling the crude liquid nitrogen trifluoride at a temperature in the range of −38 to −50° C. under a pressure ranging from 35 to 45 atm, to remove carbon tetrafluoride from the liquid nitrogen trifluoride through vaporization.

2. The method of claim 1, wherein an inert gas is bubbled through the liquid nitrogen trifluoride during the boiling process.

3. The method of claim 1, wherein gaseous carbon tetrafluoride vaporized during the boiling process is collected and degassed by using a packed tower or tray.

4. The method of claim 1, wherein the carbon tetrafluoride content of the crude liquid nitrogen trifluoride is in the range of 10 to 100 ppm.

5. The method of claim 1, wherein the carbon tetrafluoride content of the liquid nitrogen trifluoride after purification is less than 10 ppm.

* * * * *